(12) United States Patent
Numao et al.

(10) Patent No.: US 6,701,435 B1
(45) Date of Patent: Mar. 2, 2004

(54) CRYPTOGRAPHIC KEY GENERATION SYSTEM

(75) Inventors: Masayuki Numao, Kawasaki (JP); Michiharu Kudo, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/375,346

(22) Filed: Aug. 16, 1999

(30) Foreign Application Priority Data

Aug. 20, 1998 (JP) .......................................... 10-234545

(51) Int. Cl.$^7$ ................................................ H04L 9/00
(52) U.S. Cl. ........................................ 713/168; 380/277
(58) Field of Search ........................... 713/168; 380/277

(56) References Cited

U.S. PATENT DOCUMENTS 5,412,723 A * 5/1995 Canetti et al. .............. 713/155
5,625,692 A * 4/1997 Herzberg et al. ........... 380/286
5,933,504 A * 8/1999 Vanstone et al. ............. 380/30

* cited by examiner

Primary Examiner—Gilberto Barron
Assistant Examiner—Benjamin E. Lanier

(74) Attorney, Agent, or Firm—William A. Kinnaman, Jr.

(57) ABSTRACT

A method and a system for safely generating a cryptographic key that is separately provided to a plurality of servers. Through the collaboration of multiple users a cryptographic key is generated for the servers. Specifically, random values are exchanged among the multiple servers, and based on these values, cryptographic keys are generated. Even though the cyclic feature of the cryptographic keys of the individual servers is lost by the exchange of the random values by at least two servers, the cyclic feature for the overall system can be maintained. Public keys for the multiple cryptographic keys are generated and are published. A new public key is generated by combining a plurality of public keys, and a corresponding cryptographic key is calculated by using the cryptographic keys of the individual servers. A key updating cycle (depending on the number of cryptographic key registers) is introduced for each server, so that decryption key information appears only during a specific cycle (this is called a cyclic system). A time key is generated by the cyclic system, and when a plurality of such cyclic systems are prepared and are autonomically activated, a safer time key can be generated. In the above described distributed system that includes multiple servers, key information can not be obtained even when one system maintains its own state. Since the servers periodically update their cryptographic keys, it is ensured that the calculation of a cryptographic key will be inhibited until a decryption time has been is reached.

29 Claims, 4 Drawing Sheets

CRYPTOGRAPHIC KEY GENERATION SYSTEM

BACKGROUND OF THE INVENTION

1. Field of the Invention

The present invention relates to a cryptographic key generation system for network communication, and in particular to a method and system that provide for multiple servers to collaborate and to furnish divided cryptographic keys to users, so that at arbitrary times the users, without having to notify the system, can acquire cryptographic keys by combining multiple public keys, whose private parts are only available after a certain period specified in the system.

2. Description of the Related Art

A key sharing system provides for the division of a cryptographic key among a plurality of servers; a well-known system for accomplishing this is a (t, k) threshold cryptography system by Shamir. According to this system, one secret is divided among k servers, and the secret can be obtained by the collaboration of t of the k servers. For this method, first, the following (t−1)th order polynomial for a specific field F is defined:

$$f(x)=f0+f1*x+f2*x2+ \ldots +f_{t-1}*x^{t-1} \qquad (1)$$

The owner of secret first substitutes the secret for f0 in equation 1, and determines the remaining fk at random. Then, (i, f(i)) is transmitted as a share to the individual servers i. When t sets of shares are collected, the coefficients of the polynomial can be uniquely calculated and f0 can be acquired. According to the proactive secret sharing that was proposed by IBM's T. J. Watson Research Center and described in Herzberg et al. U.S. Pat. No. 5,625,692, incorporated herein by reference, in the (t, k) threshold cryptography system, (i, f(i)) is not constantly maintained, but is dynamically changed by the performance of the updating process by the servers. The value f0 can be retained unchanged by so designing the updating process. Therefore, even when an assault is mounted on a server at a specific time and the share is stolen, security can be maintained as long as the shares are not stolen from t servers at the same time. In Canetti et al. U.S. Pat. No. 5,412,723, incorporated herein by reference, a dynamic public key is described that is in a state of constant preparation for use for communication between such a server group and a user.

In the commonly owned, copending application of applicant Kudo et al., Ser. No. 09/115,422, filed Jul. 14, 1998, now U.S. Pat. No. 6,381,695, issued Apr. 30, 2002, entitled "Encryption System With Time-Dependent Decryption" and incorporated herein by reference, a time key certificate is defined, and a system by which a decryption server can determine a decryption time in accordance with the certificate is proposed. In the commonly owned, copending application of applicant Kudo, Ser. No. 09/272,873, filed Mar. 19, 1999, entitled "Mini Time Key Method and System" and incorporated herein by reference, based on Boheh-Franklin Distributed RSA Key Generation Method, by Kudoh, Information Security Society, IEICE, 1998, it is stated that the security of the time key can be enhanced based on the fact that two servers can generate an RSA key pair without knowing the secret key.

However, the technique in Herzberg et al. has as its objective the constant sharing of an unchanged item of secret that is provided in advance. Even though the shares are dynamically changed by the proactive secret sharing method, the original secret is unchanged, and the cyclic feature and the time concept using that feature are not included in this technique. In Canetti et al., updating of a communication key is included, but the process does not include the concept of a time key. Furthermore, in the secret sharing process, first, an owner of secret is defined, so that the owner generates and divides a cryptographic key and distributes it to the servers. Therefore, by an effort that is directed towards this owner, the cryptographic key can be obtained in advance.

Furthermore, a single time key server is provided in Kudo et al., and the server is in charge of the management of the decryption time. In Kudo, even though a plurality of time key servers are provided, the time key servers independently determine whether the decryption time has been reached, so that the servers are separately in charge of the operational security for a cryptographic key.

SUMMARY OF THE INVENTION

It is, therefore, one object of the present invention to provide a method and a system for safely generating a cryptographic key that is separately provided to a plurality of servers.

It is another object of the present invention to provide a method and a system for separately generating a cryptographic key, depending on the time, for a plurality of servers.

It is an additional object of the present invention to provide a method and a system for periodically generating a cryptographic key.

It is a further object of the present invention to provide a method and a system whereof a server is not in charge of the operational security for a cryptographic key.

It is still another object of the present invention to provide a method and a system whereby a user is enabled, at an arbitrary time and without the system being notified to combine multiple public keys to obtain a cryptographic key.

It is a still additional object of the present invention to provide a method and a system whereby a time key having a higher security can be generated by multiple servers.

It is a still further object of the present invention to provide a method and a system whereby calculation of cryptographic keys for multiple servers is inhibited until a decryption time is reached.

To achieve the objects, according to the present invention, through the collaboration of multiple users a cryptographic key is generated for the servers. Specifically, random values are exchanged among the multiple servers, and based on these values, cryptographic keys are generated. Even though the cyclic feature of the cryptographic keys of the individual servers is lost by the exchange of the random values by at least two servers, the cyclic feature for the overall system can be maintained. Public keys for the multiple cryptographic keys are generated and are published. A new public key is generated by combining a plurality of public keys, and a corresponding cryptographic key is calculated by using the cryptographic keys of the individual servers. A key updating cycle (depending on the number of cryptographic key registers) is introduced for each server, so that decryption key information appears only during a specific cycle (this is called a cyclic system). A time key is generated by the cyclic system, and when a plurality of such cyclic systems are prepared and are autonomically activated, a safer time key can be generated. In the above described distributed system that includes multiple servers, key information can not be obtained even when one system maintains its own state. Since the servers periodically update their cryptographic keys, it is ensured that the calculation of a cryptographic key will be inhibited until a decryption time has been reached.

DESCRIPTION OF THE PREFERRED EMBODIMENT

Figure 2:
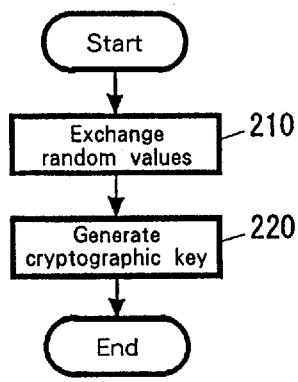
FIG. 2 is a flowchart showing the basic processing performed by a cryptographic key generation system according to the present invention.

In FIG. 2 is shown a flowchart for a basic system. Assume that servers perform only an autonomous operation that is determined in advance. A block 210 is a random value exchange block for exchanging random values among the servers. While the cyclic feature is lost from the cryptographic keys of the individual servers when the random values are exchanged, the cycle for the overall system is maintained. A block 220 is a cryptographic key generation block for generating a cryptographic key in association with a random value that is exchanged.

The above basic system will be explained in detail.

ARRANGEMENT FOR SERVERS CONSTITUTING A SPECIFIC CYCLIC SYSTEM

Figure 1:
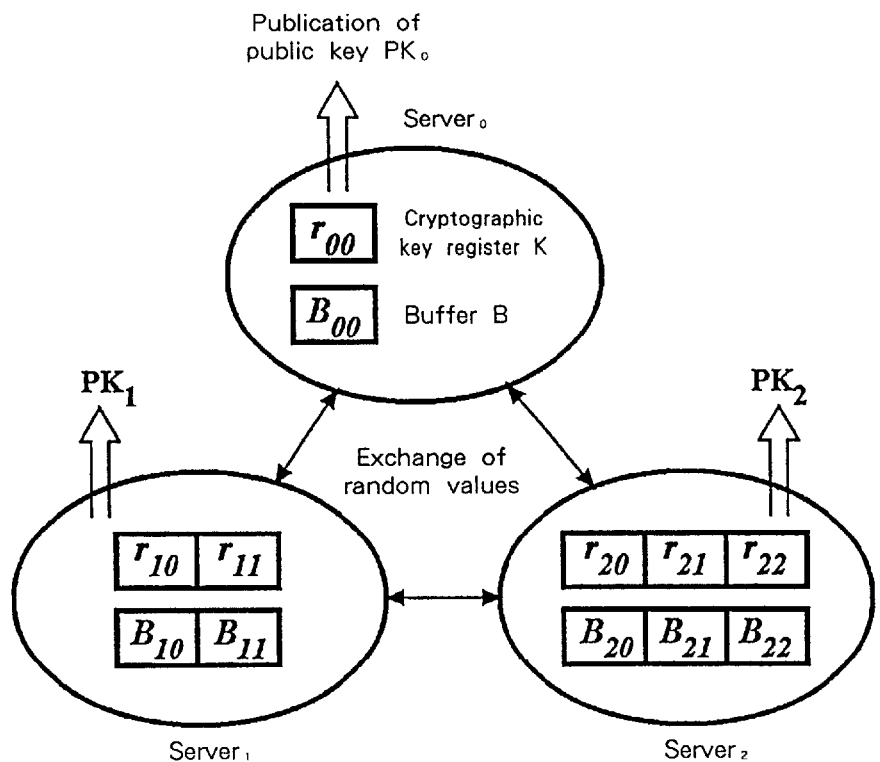
FIG. 1 is a diagram showing a process for updating the cryptographic keys for servers.

First, a process will be explained for updating cryptographic keys for a server k that has an update cycle of Tk (FIG. 1). The update cycle corresponds to the number of cryptographic key registers for each server, and when the number differs, accordingly the update cycle varies. Assume that the cyclic system is constituted by n servers. The server k having the update cycle of Tk includes Tk cryptographic key registers ($K_0, K_1, \ldots$ and $K_{Tk-1}$) and Tk random value buffers ($B_0, B_1, \ldots$ and $B_{Tk-1}$). As the initial state, assume that an appropriate random number that is equal to or smaller than p−1, where p is a large prime number, is substituted into the cryptographic key registers ($K_0, K_1, \ldots$ and $K_{Tk-1}$). At a specific time T, the server k selects a cryptographic key register ($K_k$ in this embodiment) that is obtained by T mod Tk, calculates a public key $PK_k$ by using $PK_k = g^{Kk}$ mod p and publishes it (ShowKey). Then, n−1 random values are generated and are transmitted to the other n−1 servers (SendRnd). At the same time, the server k receives random values from the other n−1 servers, and updates one of the random value buffers (RecRnd). Finally, in accordance with the random value buffers, the value of the cryptographic key register ($K_{k+1} = K_{T+1 \text{ mod } Tk}$ in this embodiment) is calculated (UpdateKey). The obtained value is employed as a cryptographic key for calculating public keys to be used next time by the servers. That is, the operation at time T is as follows (FIG. 1).

1. ShowKey: A cryptographic key (defined as $K_k$) is extracted from the cryptographic key register $k_{(T \text{ mod } Tk)}$, and a public key $Pk_k$ is calculated by using $PK = g^{Kk}$ mod p and is published.

2. SendRnd: n−1 random values $r_{kj}$ (j=0, 1, . . . k−1, k+1, . . . and n−1)<p are generated and encrypted by the public keys $PK_j$ of the individual servers j and the resultant random values are transmitted, and the sum of the random numbers $R_{k-} = \Sigma r_{kj}$ (j=0, 1, . . . k−1, k+1, . . . and n−1) is calculated.

3. RecRnd: The random numbers that are received from the n−1 servers other than the local use server k are decrypted, and the sum $R_{k+} = \Sigma r_{jk}$ (j=0, 1, . . . k−1, k+1, . . . and n−1) is calculated. $R_{k+} - R_{k-}$ is substituted in the random value buffer $B_{(T \text{ mod } Tk)}$.

4. UpdateKey: A cryptographic key ($K_{k+1}$) that is to be used the next time T+1 is extracted from the cryptographic key register $K_{(T+1 \text{ mod } Tk)}$, and the sum $\Sigma B_j$ (j=0, 1, . . . and Tk) for the random value buffers is calculated. The value of the register is updated to $K_{k+1 \text{ new}} = K_{k+1 \text{ old}} + \Sigma B_j$.

CYCLIC SYSTEM HAVING THE LEAST COMMON MULTIPLE OF UPDATING CYCLES FOR MULTIPLE SERVERS

Figure 3:
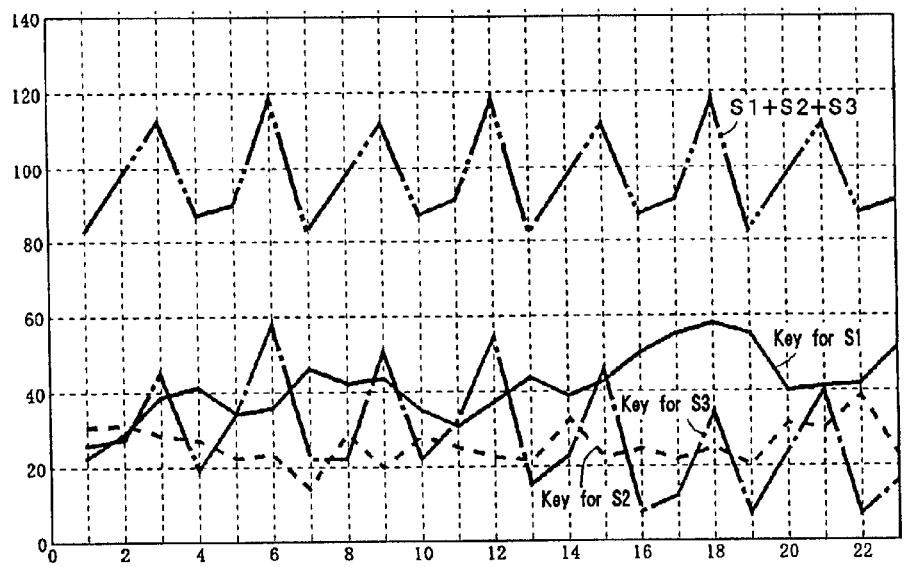
FIG. 3 is a graph showing an example movement of a cyclic system according to the present invention.

A cyclic system having the least common multiple of the updating cycles for the above described servers can be provided by synchronizing the key updating processes of the servers. In FIG. 3 are shown the changes in the cryptographic keys of the servers having update cycles 1, 2 and 3, and the changes in the sums of those cryptographic keys. While the individual cryptographic keys are changed at random, the sums for those keys reveal a cycle of 6.

Figure 6:
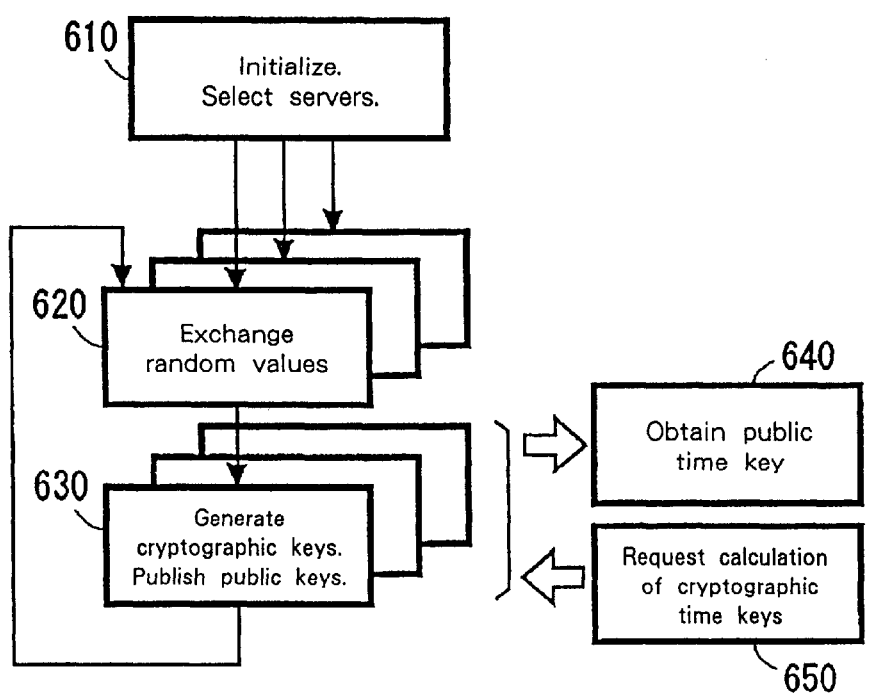
FIG. 6 is a flowchart showing the processing for generating a time key.

The method for generating a time key is shown in FIG. 6.

First, at step 610, for initialization, a plurality of servers are selected in accordance with the cycle of a cyclic system that is to be constituted. At this time, redundancy is provided to a degree. To configure a cyclic system having a cycle of 3, for example, a single server having the updating cycle of 3 is not employed, but instead two or more servers having the updating cycles of 1 and 3 are employed. At step 620, random values are exchanged among the servers by using the above described method. At step 630 the servers repeat the updating of their cryptographic keys and the publication of corresponding public keys in order to autonomically operate the cyclic system. At step 640, a user calculates a product of the public keys of the servers to constitute a public time key. At this time, it is up to the user to determine when to create the public time key, and the user does not need to notify the servers of the time that is selected. To decrypt a message encrypted by using the public time key, at step 650, the calculation of the sum of the cryptographic keys is requested of all the servers, so that a cryptographic time key can be obtained. This request should be issued following the time defined by the cycle of the cyclic system, for otherwise the cryptographic key that corresponds to the public key can not be acquired.

METHOD FOR PREPARING A PLURALITY OF CYCLIC SYSTEMS TO GENERATE A SAFER TIME KEY

A time key may be generated by one cyclic system. However, to generate a greater variety of time keys safely, a plurality of cyclic systems are prepared for the generation of an encrypted time key.

Figure 4:
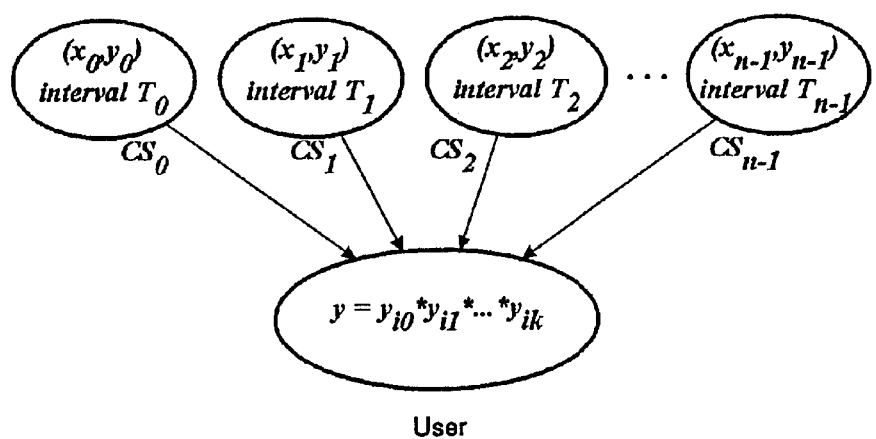
FIG. 4 is a diagram for explaining the combining of cyclic public keys by ElGamal.

As is shown in FIG. 4, when the total number of cyclic systems is n, a cryptographic key for a cyclic system i is xi and its public key is yi, and the origin at Zp is g for an ElGamal encryption, $$yi = g^{xi} \bmod p.$$

When the user selects a subset of cyclic systems and calculates the product of their public keys, $$y = y_{p0} * y_{p1} * \ldots * y_{pk-1}.$$

A cryptographic key that corresponds to y is $$x = x_{p0} + _{p1} + \ldots + x_{pk-1},$$

which is the sum of the cryptographic keys for a corresponding subset. However, since the cryptographic keys are calculated only periodically, cryptographic key information is obtained only at the time defined by the least common multiple of the cycles of the cyclic systems that are included in the subset.

The process for the decryption of a time key can be performed by sequentially requesting the calculation of the sum by the systems that have obtained the public key. In this case, since a specific decryption time key, i.e., information for a partial sum of the systems, may be a clue that can be used to obtain the other decryption time keys, a decryption server (DS) is prepared for the decryption of the message. The processing for this is performed as follows.

1. A message that is encrypted using a time key is transmitted to a decryption server DS.
2. The decryption server DS generates a random value r, and requests that the first cyclic system S1 add a cryptographic key to the random value r.
3. The cyclic system S1 adds the current cryptographic key KS1 to the random value r, and requests that the next cyclic system S2 add a cryptographic key.
4. The cyclic systems S2 to Sn−1 perform the same process at step 3.
5. The final cyclic system Sn transmits the result to the decryption server DS, which then subtracts the random value r from the sum to obtain a decryption key. The decryption process in the individual cyclic systems is performed in the same manner, i.e., by sequentially transmitting a request message for the calculation of the sum of the cryptographic keys to the servers that constitute the cyclic systems.

STEP-BY-STEP ENCRYPTION/DECRYPTION METHOD

According to the present invention, the construction of a cycle depends on the information concerning which systems are to be combined. If a recipient has this information, therefore, the recipient would be able to assault the individual combined systems, and, for example, would be able to issue a decryption request to the systems. In order to prevent such an assault, combined information is encrypted at the same time as the encrypting keys. Assume that public keys PK1, PK2 and PK3 of cyclic systems CS1, CS2 and CS3 are employed for encryption. In this case, while the combined public key Y is Y=PK1 * PK2 * PK3, and message M is encrypted using $\{g^k, M * Y^k\}$, when arbitrarily selected k<p−1 the combined information is defined {CS1, PK1({CS2, PK2(CS3)})} at the same time. It should be noted that PKi( ) is an encryption function. As a result, the next transfer destination can not be obtained until the information has been decrypted using CS1.

Figure 5:
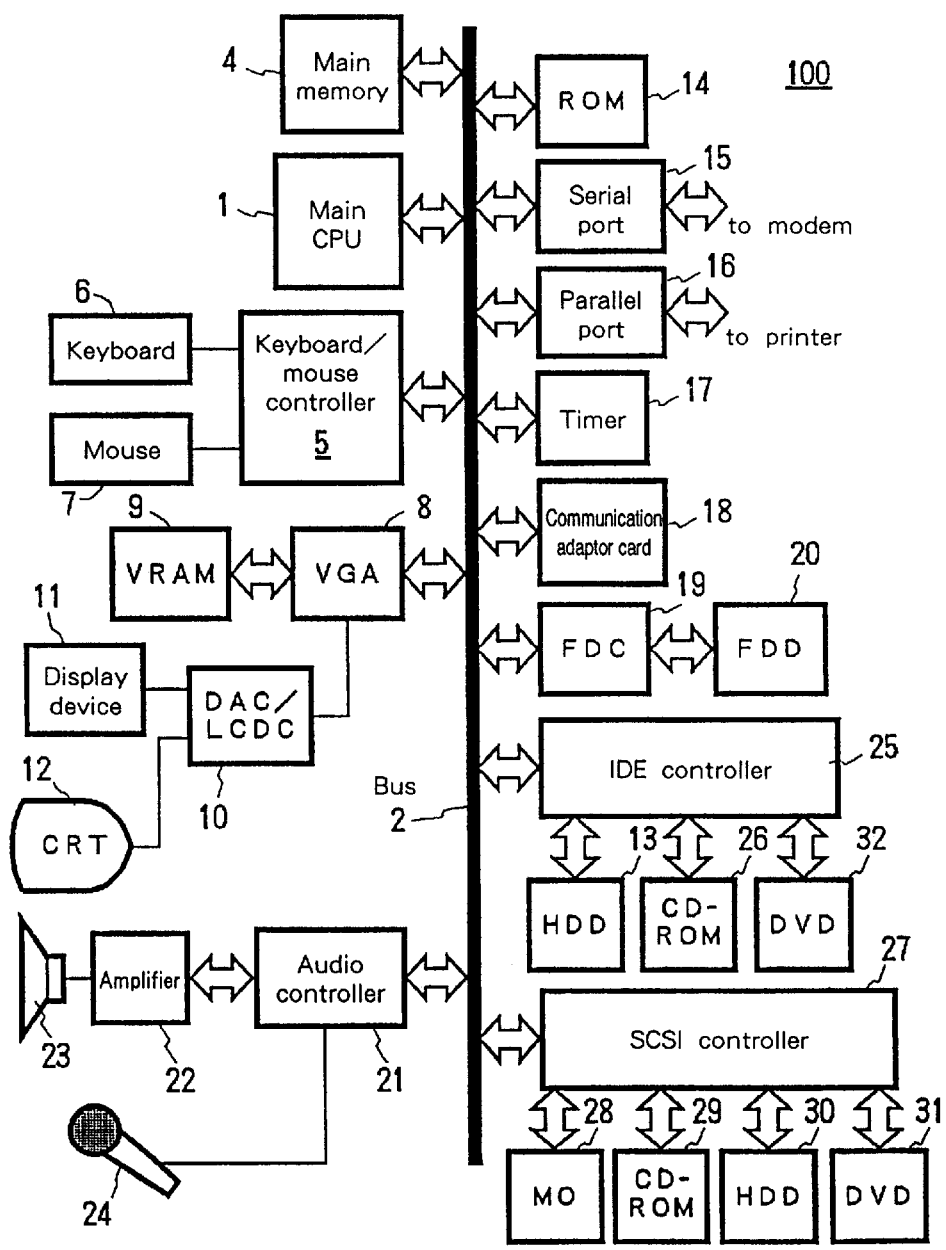
FIG. 5 is a diagram illustrating an example hardware arrangement used for a server according to the present invention.

In FIG. 5 is shown an example hardware arrangement for the server according to the present invention. A system 100 comprises a central processing unit (CPU) 1 and a memory 4. The CPU 1 and the memory 4 are connected by a bus 2 and an IDE controller 25 to a hard disk drive 13 (or to a storage medium drive, such as an MO, a CD-ROM 26 or a DVD 32), which is an auxiliary storage device. Similarly, the CPU 1 and the memory 4 are connected by the bus 2 and a SCSI controller 27 to a hard disk drive 30 (or to a storage medium drive, such as an MO 28, a CD-ROM 29 or a DVD 31), which is an auxiliary storage device. A floppy disk drive 20 is connected to the bus 2 via a floppy disk controller 19.

A floppy disk is inserted into the floppy disk drive 20. Code or data for a computer program that interacts with an operating system and issues an instruction to the CPU 1 to implement the present invention can be stored on the floppy disk or on the hard disk drive 13 (or on the MO, the CD-ROM 26 or the DVD 32) and in a ROM 14. This computer program is executed by loading it into the memory 4. The code for the computer program can be compressed, or can be divided into a plurality of segments for storage on a plurality of storage mediums.

The system 100 further comprises user interface hardware components such as a pointing device (a mouse or a joystick) 7 and a keyboard 6 for entering data, and a display device 12 for providing visual data for a user. Furthermore, a printer can be connected to the system 100 via a parallel port 16, or a modem can be connected via a serial port 15. The system 100 can be connected to a network via the serial port 15 and a modem, or via a communication adaptor 18 (an ethernet or a token ring card) for communicating with another server or another computer. A remote transceiver is connected to the serial port 15, or to the parallel port 16, for exchanging data with the system 100 by using infrared rays or wires.

A loudspeaker 23 is used to receive, via an amplifier 22, an audio signal obtained by D/A conversion (digital/analog conversion) performed by an audio controller 21, and to output the signal as sound. The audio controller 21 performs the A/D (analog/digital) conversion of audio information received via a microphone 24 in order to introduce external audio information into the system 100.

As is described above, it would be easily understood that the server of the present invention can be provided by a normal personal computer (PC) or a workstation, a notebook PC, a palmtop PC, a network computer, a television set or other electric home appliance that incorporates a computer, a game machine having a communication function, a communication terminal having a communication function, such as a telephone, a facsimile machine, a portable telephone, a PHS or a PDA, or a combination of the components described above. It should be noted, however, that these components are merely examples and not all of them are requisite for the present invention.

According to the present invention, since a user, without notifying the system, can obtain an encryption key at an arbitrary time, the system will not possess the decryption key information until the decryption time has been reached. In other words, the user can determine the decryption time without notifying the server. Furthermore, since the user can obtain a new public key by combining public keys, a corresponding cryptographic key is not available because it is divided and distributed to multiple servers. Since the servers collaborate with each other to periodically manage a decryption key, the key can not be obtained until the decryption time. According to the present invention, illegal activities performed by a server can be prevented, and the security of the overall system can be increased.

What is claimed is:

1. A system for time key cryptography through the collaboration of multiple servers, each of which stores a cryptographic key that is cyclically updated, comprising:
   (1) means for encrypting a message using a public time key generated from said cryptographic keys;
   (2) means for thereafter updating said cryptographic keys in accordance with update cycles having a different period on each of said servers; and
   (3) means for decrypting said message using a private key generated from said cryptographic keys following the lapse of a common multiple of the periods of the update cycles on said servers.

2. The system according to claim 1, wherein said common multiple is a least common multiple of the periods of the update cycles on said servers.

3. The system according to claim 1, wherein said public time key is generated from public keys derived from the cryptographic keys stored by said servers.

4. A method for time key cryptography through the collaboration of multiple servers, each of which stores a cryptographic key that is cyclically updated, comprising the steps of:
   (1) encrypting a message using a public time key generated from said cryptographic keys;
   (2) thereafter updating said cryptographic keys in accordance with update cycles having a different period on each of said servers; and
   (3) decrypting said message using a private key generated from said cryptographic keys following the lapse of a common multiple of the periods of the update cycles on said servers.

5. The method according to claim 4, wherein said common multiple is a least common multiple of the periods of the update cycles on said servers.

6. The method according to claim 4, wherein said public time key is generated from public keys derived from the cryptographic keys stored by said servers.

7. A medium for storing a program for time key cryptography through the collaboration of multiple servers, each of which stores a cryptographic key that is cyclically updated, said program comprising:
   (1) a function for encrypting a message using a public time key generated from said cryptographic keys;
   (2) a function for thereafter updating said cryptographic keys in accordance with update cycles having a different period on each of said servers; and
   (3) a function for decrypting said message using a private key generated from said cryptographic keys following the lapse of a common multiple of the periods of the update cycles on said servers.

8. The medium for storing a program according to claim 7, wherein said common multiple is a least common multiple of the periods of the update cycles on said servers.

9. The medium for storing a program according to claim 7, wherein said public time key is generated from public keys derived from the cryptographic keys stored by said servers.

10. The system according to claim 1, wherein said updating means comprises:
    (1) means for exchanging random values among said multiple servers; and
    (2) means for synchronously generating cryptographic keys by employing said random values at at least two of said multiple servers.

11. The system according to claim 10, wherein said means for synchronously generating said cryptographic keys comprises means for generating said cryptographic keys using cryptographic key registers belonging to said servers.

12. The system according to claim 11, wherein each of said servers has a different number of cryptographic key registers corresponding to the period of the update cycle on that server.

13. The system according to claim 11, wherein said means for synchronously generating said cryptographic keys comprises means for calculating public keys using cryptographic keys generated by said cryptographic key registers and for publishing said public keys.

14. The system according to claim 13, wherein said means for exchanging said random values comprises means for encrypting said random values by using said public keys and for exchanging the resultant values.

15. The system according to claim 14, wherein said means for exchanging said random values comprises means for decrypting random values received from servers other than local use servers and for using said random values to update random value buffers.

16. The system according to claim 15, wherein said means for synchronously generating said cryptographic keys comprises means for extracting from said cryptographic key registers cryptographic keys that are next to be generated and for updating the values in said cryptographic key registers by employing said cryptographic keys and values in said random value buffers.

17. The method according to claim 4, wherein said updating step comprises the steps of:
    (1) exchanging random values among said multiple servers; and
    (2) synchronously generating cryptographic keys by employing said random values at at least two of said multiple servers.

18. The method according to claim 17, wherein said step of synchronously generating said cryptographic keys comprises the step of generating said cryptographic keys using cryptographic key registers belonging to said servers.

19. The method according to claim 18, wherein each of said servers has a different number of cryptographic key registers corresponding to the period of the update cycle on that server.

20. The method according to claim 18, wherein said step of synchronously generating said cryptographic keys comprises the step of calculating public keys using cryptographic keys generated by said cryptographic key registers and publishing said public keys.

21. The method according to claim 20, wherein said step of exchanging said random values comprises the step of encrypting said random values by using said public keys and exchanging the resultant values.

22. The method according to claim 21, wherein said step of exchanging said random values comprises the step of decrypting random values received from servers other than local use servers and using said random values to update random value buffers.

23. The method according to claim 22, wherein said step of synchronously generating said cryptographic keys comprises the step of extracting from said cryptographic key registers, cryptographic keys that are next to be generated and updating the values in said cryptographic key registers by employing said cryptographic keys and values in said random value buffers.

24. The medium for storing a program according to claim 7, wherein said updating function comprises:
   (1) a function for exchanging random values among said multiple servers; and
   (2) a function for synchronously generating cryptographic keys by employing said random values at at least two of said multiple servers.

25. The medium for storing a program according to claim 24, wherein said function for synchronously generating said cryptographic keys comprises a function for generating said cryptographic keys using cryptographic key registers belonging to said servers.

26. The medium for storing a program according to claim 25, wherein said function for synchronously generating said cryptographic keys comprises a function for calculating public keys using cryptographic keys generated by said cryptographic key registers and for publishing said public keys.

27. The medium for storing a program according to claim 26, wherein said function for exchanging said random values comprises a function for encrypting said random values by using said public keys and for exchanging the resultant values.

28. The medium for storing a program according to claim 27, wherein said function for exchanging said random values comprises a function for decrypting random values received from servers other than local use servers and for using said random values to update random value buffers.

29. The medium for storing a program according to claim 28, wherein said function for synchronously generating said cryptographic keys comprises a function for extracting from said cryptographic key registers cryptographic keys that are next to be generated and for updating the values in said cryptographic key registers by employing said cryptographic keys and values in said random value buffers.

* * * * *